Figure 1:
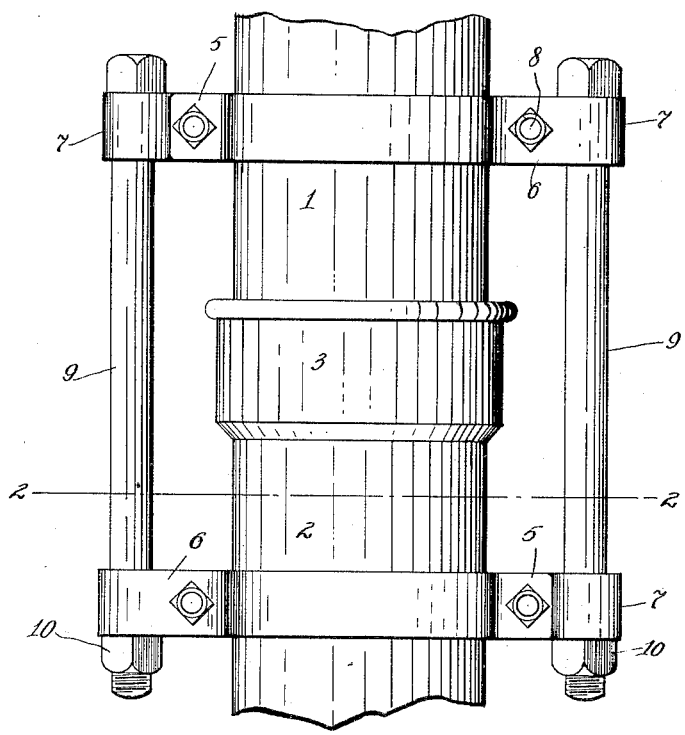

M. C. ROSENFELD.
PIPE CLAMP.
APPLICATION FILED JAN. 4, 1913.

1,098,409.                                                    Patented June 2, 1914.

Witnesses:
P. L. Bruck.
Justin L. Macklin

Inventor.
Mortimer C. Rosenfeld,
By Hull & Smith
Attys.

UNITED STATES PATENT OFFICE.

MORTIMER C. ROSENFELD, OF CLEVELAND, OHIO.

PIPE-CLAMP.

1,098,409.  Specification of Letters Patent.  Patented June 2, 1914.

Application filed January 4, 1913. Serial No. 740,163.

*To all whom it may concern:*

Be it known that I, MORTIMER C. ROSENFELD, a citizen of the United States, residing at Cleveland, in the county of Cuyahoga and State of Ohio, have invented a certain new and useful Improvement in Pipe-Clamps, of which the following is a full, clear, and exact description, reference being had to the accompanying drawings.

This invention relates to pipe clamping devices and more particularly to devices of this kind which are particularly adapted to be clamped to adjacent ends of pipe sections to afford a means whereby these sections may be drawn together. Heretofore it has been proposed to accomplish this result in connection with a pair of clamps, each clamp consisting of a plurality of clamping members and each member being adapted to embrace a segment of the rounded surface of a pipe, there being bolts for coupling said clamping members together, the bolts extending through half-eyes in adjacent members coöperating to form complete eyes for the reception of such bolts. By adjusting the bolts, the pipe ends are forced into operative relation to each other. This construction is liable to the objections that, in order to accommodate the bolts which extend from clamp to clamp, it is necessary that each clamping member be of such angular extent and fit the pipe so exactly as to bring the ends of adjacent clamp segments in close proximity; otherwise, the projecting ends of these members or segments will not abut and the eye formed in the opposed clamping extensions will be distorted, frequently so much as to be incapable of retaining a bolt therewithin.

It is the object of this invention to provide an extremely simple and economical clamping device which will have a wide range of adaptability, the members of which will be interchangeable, and which may be adjusted to suit varying sizes of pipes without affecting the size and operative locations of the eyes which receive the clamping bolts. I acomplish these results by the construction illustrated in the drawings forming part hereof, wherein—

Figure 2:
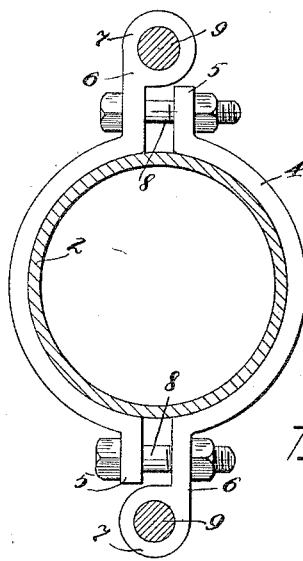

Figure 1 represents an elevation showing the abutting ends of two pipe sections with my clamping devices applied thereto; Fig. 2 a sectional detail corresponding to the line 2—2 of Fig. 1; and Fig. 3 a view, similar to Fig. 2, of a modified form of the invention.

Describing by reference characters the parts illustrated herein, 1 and 2 denote the opposed and adjacent ends of a pair of pipe sections, the section 2 being shown as provided with a hub 3 which the end of the other section enters. For the purpose of drawing these pipe sections together and forming a tight joint, I apply to the adjacent ends of the sections a pair of clamps and draw these clamps, and the attached pipe sections, together by means of bolts connecting the clamps. Each clamp as shown in Figs. 1 and 2, comprises a pair of symmetrical and interchangeable members constructed as follows: 4 denotes a curved segmental strap, the curvature being approximately that of the pipe section with which it will be employed and its angular extent being approximately 180°, where each clamp comprises but two segmental members. This strap is provided with a lug 5 projecting from one end thereof and provided with an aperture for the reception of a bolt. At its other end it is provided with a lug 6 which is also provided, adjacent to the curved part of the strap, with an aperture for a bolt, but is provided with an extension formed into an eye 7, said eye projecting substantially at right angles from the lug 6 and toward the adjacent and coöperating member of the clamp. Coöperating with the member just described is a duplicate thereof having the lugs and eye described. In assembling, the lug 5 of one of the clamping members is placed on the same side of the pipe as the lug 6 of the other member and the clamping members are connected by means of bolts 8 extending through the apertures in the said lugs. When the parts of the clamp are connected, the complete clamp will be provided with a pair of symmetrical, opposed eyes 7. Owing to the length of the lug 6, the eye 7 will clear the end of the lug 5 as the opposed clamping members are adjusted toward each other. Furthermore, even though considerable space exists between the lugs of the opposed clamping members, as when they are applied to pipes of considerably greater size than they will exactly fit, the centers of the eyes 7 will be substantially half-way between the lugs 5 and 6, whereby these eyes will be in symmetrical relation to the pipe sections and to the clamp, enabling an efficient coupling to be made between the pipe sections when the coupling bolts are applied to the eyes of the clamps on the said section.

In connecting a pair of pipe sections, it is only necessary to apply the clamps to said sections in the manner shown in the drawing, taking care that the eyes of one clamp are in alinement with those of the other. The coupling bolts 9 will thus be applied to these eyes and the pipe sections be forced into close and leak-proof engagement by means of the nuts 10.

Figure 3:
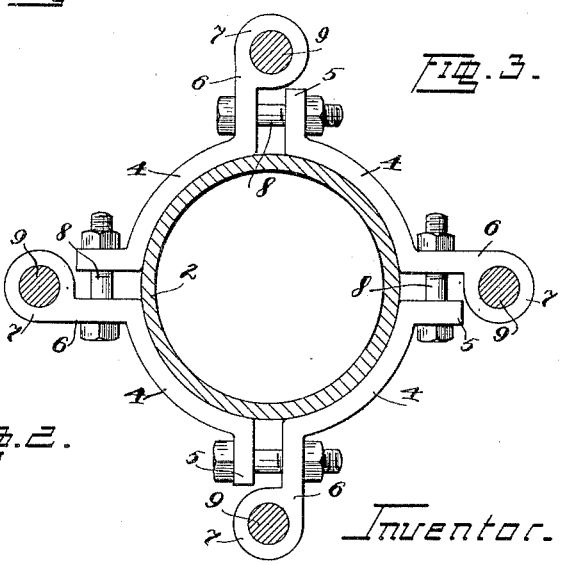

In Fig. 3, each clamp is shown as composed of more than two symmetrical members, four such members being illustrated. Each member, however, is substantially identical with each member of Figs. 1 and 2, differing therefrom only as to its angular extent, the segment in this case being approximately 90° instead of 180°. In this construction the clamps can be drawn together by four bolts spaced 90° apart instead of by two bolts spaced 180° apart. Among the advantages of this construction are the interchangeability of the segmental members of each clamp; the cheapness of construction (made possible by the use of a complete eye in each clamping member and by the interchangeability of the members); the convenience of application to the pipe sections (secured by the arrangement of the eyes whereby adjustment of the clamping members is permitted and ample clearance is provided between the connecting bolts and the hub); also the efficiency secured through the balanced or symmetrical location of the eyes.

Having thus described my invention, what I claim is:—

1. A clamping device for the purpose set forth comprising a plurality of symmetrical clamping members each having a short clamping lug and a long clamping lug at opposite ends thereof, the long clamping lug being provided with an eye and the clamping members being arranged so that the short lug of one is adjacent to the long lug of another, and means adjustably connecting the lugs of said clamping members, the connecting means being located between the eye of the long lug and the body of the member carrying the same.

2. A clamping device for the purpose set forth comprising a plurality of symmetrical segmental clamping members each having a pair of clamping lugs projecting from opposite ends thereof, one of the lugs of each member being provided with an eye and the clamping members being arranged so that the eye of one member is adjacent to an eyeless lug of the other, and means adjustably connecting the lugs of said clamping members, the connecting means being located between the eye of the long lug and the body of the member carrying the same.

3. A clamping device comprising a plurality of clamping members each having at one end a short lug and at the opposite end a long lug provided at its end with an eye, said clamping device being arranged so that the short lug of one member is adjacent to the long lug of another and the eye on the long lug of each clamping member projects toward and adapted to overhang the short lug of the coöperating member, and means adjustably connecting the lugs of said members.

4. A clamping device comprising a plurality of clamping members each having lugs at opposite ends thereof, one of said lugs being provided with an eye, said clamping device being arranged so that the eye on each clamping member projects toward the eyeless lug of the coöperating member, and means adjustably connecting the lugs of coöperating members, the connecting means being located between the eye of the long lug and the body of the member carrying the same.

5. A clamping device comprising a plurality of clamping members each having a short lug at one end and a relatively long lug at the other end, the long lug being provided with an eye at its end and the clamping members being arranged so that the short lug of one member is adjacent the long lug of another member and the eye on each member projects toward, but is located beyond the end of, the short lug of the coöperating member, whereby said members may be adjusted toward and from each other, and means adjustably connecting the lugs of the members.

In testimony whereof, I hereunto affix my signature in the presence of two witnesses.

MORTIMER C. ROSENFELD.

Witnesses:
 J. B. HULL,
 BRENNAN B. WEST.